INVENTOR.
Nyyrikki K. Stenberg

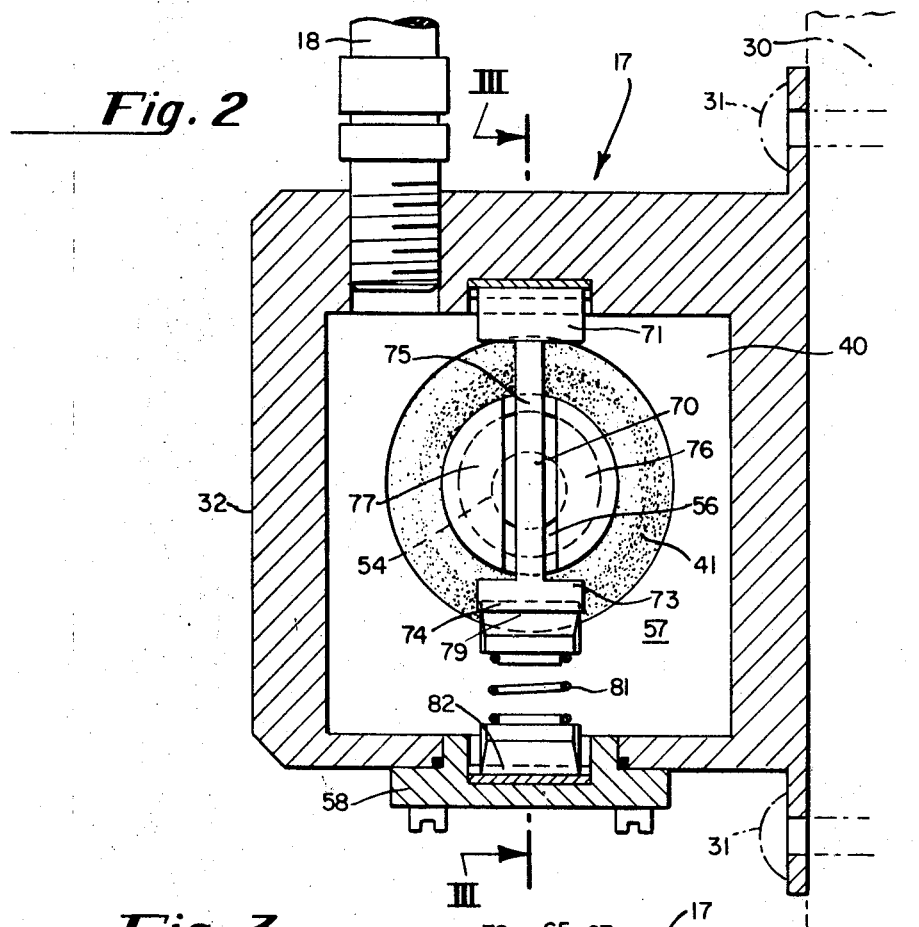
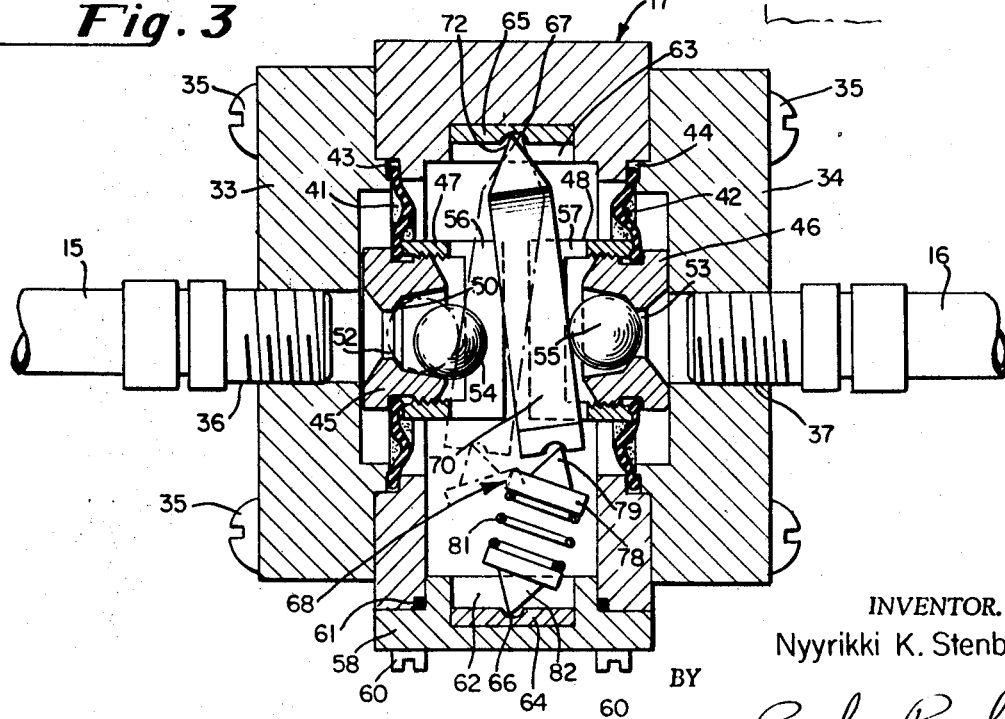

United States Patent Office 3,606,907
Patented Sept. 21, 1971

3,606,907
SWITCHOVER CONTROL DEVICE FOR GAS SUPPLY SYSTEM
Nyyrikki K. Stenberg, Roslyn, Pa., assignor to Capital Controls Co., Inc., Colmar, Pa.
Filed Mar. 20, 1970, Ser. No. 21,245
Int. Cl. F16k 11/10
U.S. Cl. 137—113           12 Claims

ABSTRACT OF THE DISCLOSURE

A switchover device is provided, for a gas supply system having a plurality of gas supplies therefor, for alternative use, and with the device being adapted for automatically switching from one supply to another, upon depletion of the one supply.

BACKGROUND OF THE INVENTION

In gas supply systems, particularly systems designed for introduction of chlorine gas, and like gases into water systems such as swimming pools, waste treatment systems, and other water treatment systems, there has been developed a system for controlling, metering, and regulating gas, such as chlorine gas, for delivery into an eductor, under vacuum. The gas is then delivered into the water supply that is to be treated. A system is disclosed in Pat. No. 3,220,430, utilizing a chlorinator unit that is mounted directly onto a tank having a gas over a liquid, that is delivered solely by vacuum delivery means, to an eductor or ejector.

In accordance with the present invention, there has been developed a device specifically adapted for use with a pair of tank mounted chlorinators, or even for use for any other type of gas supply systems, wherein the switchover device is entirely vacuum operated. In accordance with the system of the type indicated in the patent designated above, as one tank would become empty, if continuous treatment is desired, without interruption during the change of the tank, there arose a need to automatically effect such a changeover.

Because of the nature of chlorine gas and other gases that are desired to be introduced into water, positive pressure operated switchover devices (operating above 14.7 pounds per square inch) are not adaptable, because many of the gases, the use of which is contemplated, are highly toxic, and dangerous to personnel in the area in which they are used. Thus, should a positive pressure system for example, a tube or like distribution line happen to break, should the gas be under positive pressure, severe damage to personnel in the area could occur. However, with a vacuum operated system, even should a break occur, the result would be non-delivery of the gas only, and not escape of a toxic gas. Thus, positive pressure switchover devices are not usable in vacuum systems, because they generally depend upon a continuous supply of gas under positive pressure, for their normal operation.

SUMMARY OF THE INVENTION

The present invention is directed toward providing a novel switchover device for use with a vacuum system, whereby there may be effected the automatic switching over from one gaseous supply to another, under vacuum.

Accordingly, it is a primary object of this invention to provide a novel switchover device.

It is a further object of this invention to provide a novel switchover device which is vacuum operated, or operated at a negative pressure, and which effects a switchover, from one source to another, when one source is depleted, or nearly depleted.

It is a further object of this invention to accomplish the above object, wherein a gas supply delivery line increases in vacuum or negative pressure (decrease in absolute pressure).

It is a further object of this invention to provide an entire gas system utilizing a switchover device of the type set forth in any of the objects above.

It is another object of this invention to provide a novel over-center gas operated switchover device.

Other objects and advantages of the present invention will be readily apparent to those skilled in the art from a reading of the following brief descriptions of the drawing figures, detailed description of the preferred embodiment, and the appended claims.

In the drawings:

FIG. 2 is an enlarged sectional view of the switchover device illustrated in FIG. 1, taken generally along the line II—II of FIG. 1, and wherein several of the components of the switchover device are clearly illustrated.

FIG. 3 is a sectional view, through the apparatus of FIG. 2, taken generally along the line III—III of FIG. 2, and wherein other components of the switchover device of this invention are clearly illustrated.

DESCRIPTION OF THE PREFERRED EMBODIMENT

Figure 1:
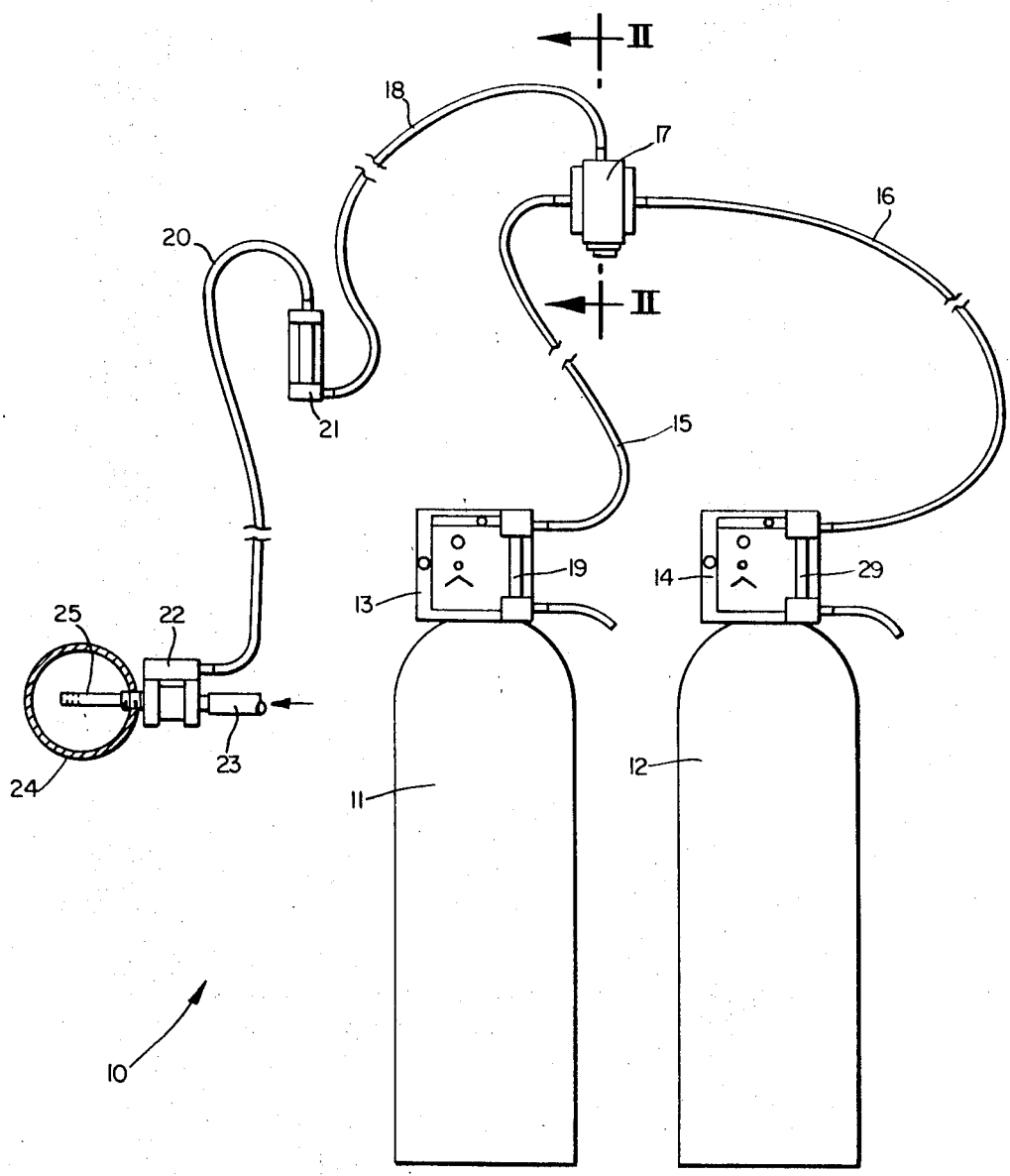
FIG. 1 is an illustration of the basic components of an entire system in accordance with this invention.

Referring now to the drawings in detail, reference is first made to FIG. 1, wherein there is illustrated a system, generally designated by the numeral 10, comprising first and second gas supply tanks 11 and 12, each containing chlorine or like gas over a liquid and each being provided with a chlorinator 13, 14, respectively mounted thereon. The chlorine gas in each of the containers 11 and 12 is under a positive pressure. The chlorinators 13 and 14 are adapted to convert the gas from the containers 11 and 12, into a negative pressure, or vacuum induced flow, which is delivered through the lines 15 and 16, to a switchover device 17.

The switchover device 17 is operated by means of a vacuum induced through lines 18 and 20, also passing through a meter 21 or like device for adjusting the flow rate, with the vacuum being induced in the line 20 by means of an eductor, or ejector unit 22, as disclosed in Pat. 3,220,430.

The ejector 22 is generally operated by water supplied therethrough by a line 23, into which the gas is introduced in the ejector 22, for distribution into a water line 24, to a suitable inlet line 25.

The water line 24 may be part of a swimming pool recirculation system, a sewage line, or part of any other system the purification of which is desired.

The meter 21 may comprise a flow meter as illustrated, with a suitable flow adjustment therefor, or in fact could be combined with the unit 17, as desired. The purpose is to facilitate adjustment of the desired flow rate to the ejector 22.

Referring now to FIGS. 2 and 3 of the drawings, it will be seen that the switchover device 17 is generally mounted on a wall 30 or the like, illustrated in phantom, and secured thereto by suitable bolts or like fastener members 31, as desired.

The unit 17 includes a center body portion 32 having body flanges 33 and 34 connected thereto by screws or like fasteners 35.

Gas inlets 36 and 37 are threaded into the flanges 33 and 34, respectively, and have gas inlet lines 15 and 16 connected thereto by any suitable means.

The switchover device 17 is provided with a single gas outlet 38, which is threaded into the center body 32, and to which is connected the line 18 providing the vacuum source therefor.

A cavity 40 is provided in the body 32, in the form of a cut-out, which may either be circular or rectangular (as shown) in configuration. A pair of circular diaphragms 41 and 42, of rubber, plastic, or like construction, having the desired flexibility, are positioned in associated recesses 43 and 44, respectively, in the body 32, and are securely maintained in position, by wedging engagement between the flange 33 and the body 32, and the flange 34 and the body 32, respectively.

A pair of seat members 45 and 46 are provided in the form of diaphragm bolts, and are secured to associated diaphragms 41 and 42, by suitable spacer nuts 47 and 48, respectively. The seating members 45 and 46 are provided with seats 50 and 51, disposed annularly about associated gas inlet ports 52 and 53. Inlet blocking members, in the form of spherical balls 54 and 55 are provided, for seated engagement in the seats 50 and 51, and for movement out of such seated engagement, between the full line and phantom positions illustrated, for example, with respect to the ball 54 in FIG. 3.

The nuts 47 and 48 are provided with longitudinal slots 56 and 57, as illustrated for example, most clearly in FIG. 2, with respect to slot 56.

It will be noted that a chamber 57 is provided inwardly of the body 32, defined on opposite sides by the diaphragms 41 and 42, and their associated seating members and nuts, 45, 47, 46, 48. This chamber 57 is vacuum-tight, under a desired negative operating pressure, for example, at a vacuum of twenty inches of water, or as desired.

An access plate or cap 58 is provided, secured to the body 32 by suitable screws or like fasteners 60, and having a gasket 61 disposed therebetween, in order to secure air-tight engagement, with the cap 58 providing access to the interior of the chamber 57, when removed.

A recess 62 is provided in the interior of the cap 58, generally similar to a recess 63 in the body 32, as illustrated in FIGS. 2 and 3, with the recesses 62 and 63 being provided with toggle plates 64 and 65, respectively. The plates 64 and 65 are provided with elongated grooves 66 and 67, which are each in receiving engagement with opposite ends of an over-center linkage, generally designated by the numeral 68.

The linkage 68 comprises a toggle spindle 70, having an enlarged upper end 71, for stability, as illustrated in FIG. 2, that has an apex 72 at the top thereof, for engagement within the groove 67. The lower end of the spindle 70 is also enlarged, at 73, and is provided with an elongated groove 74. The two ends 71 and 73 are connected by a connection portion 75, of reduced thickness, as illustrated in FIG. 2, which is sized for clearance within the slots 56 and 57 of the nuts 47 and 48, respectively, for spanning of the spindle 70 by head portions 76 and 77 of each of the nuts 47 and 48, for clearance of the spindle 72, during its overcenter movement, for engagement with either of the balls 54 and 55.

A spring pivot comprising a first pivot element 78, and a second pivot element 80, connected by a suitable compression spring 81 is also provided, with the members 78 and 80 being of a width substantially equal to the width of the portion 71 and 73 of the spindle 70, and with the elements 78 and 80 each being provided with an apex 79, 82, for engagement within suitable grooves 74 and 66.

It will be apparent from the above, that with the linkage 68 arranged as illustrated in FIGS. 2 and 3, the linkage 68 is adapted to be moved between the full line and phantom positions illustrated in FIG. 3, whereby the spindle 70 will be in engagement with either the ball 55, or the ball 54. Whichever ball or other inlet blocking means or member is engaged, will be seated in its appropriate seat 50 or 51, blocking the inlet port 52 or 53 thereof.

OPERATION

The device 17 of this invention operates as follows. Assuming that chlorinator number 11 is in operation and chlorinator number 12 is shut-off, due to the seating of the ball 55 in its seat 51, as illustrated in FIG. 3, the ball 54 is in approximately the full line position illustrated in FIG. 3, such that the port 52 is opened, and gas is being provided through line 15, under a vacuum induced through the line 18. Accordingly, the vacuum or negative pressure on each side of diaphragm 41 is the same, and is at the same vacuum or negative pressure, as is the operating pressure of the chlorinator 13.

The vacuum inside the chamber 57 will generally be about twenty inches of water. The vacuum induced by the ejector 22 is of course greater (at a lower absolute pressure), such that there is a pressure differential across the meter or adjustment unit 21. In the arrangement illustrated in FIG. 3, the vacuum in the line 16 from chlorinator 14 and tank 12 is zero, because there is no flow through line 16, due to the seated position of the ball 55, as held in a closed position due to the over-center position of the linkage 68, as maintained by the spring 81.

The gas in the tank 11 is under a positive pressure, and it is converted to a negative pressure or vacuum before entering the line 15, by the chlorinator unit 13. As the chlorine or other gas in the tank 11 becomes diminished, or if the tank 11 becomes empty, the vacuum within the line 15 will not be reduced by positive pressure from the tank 11, and accordingly, the vacuum in the line 15 will increase, or assume a greater negative pressure. This same increased vacuum will, of course, be present in the chamber 57, and will draw the diaphragm 42 inwardly, against the force of the linkage 68, with the ball 55 still being seated in its seated position on the element 46. After passing the dead center position between the full line and phantom positions illustrated in FIG. 3, the spindle 70 of the linkage 68 is still in engagement against the ball 55, and the ball 54 is still in the full line position illustrated in FIG. 3. Also, at the dead center position of the linkage 68, the vacuum is still increasing within the chamber 57, due to the lack of gas supply from the tank 11, which would otherwise reduce the net vacuum supplied through the line 15.

After passing the dead center position, the linkage 68 is flipped over to the phantom line position illustrated in FIG. 3, with the spindle 70 in engagement against the ball 54 in its seated position illustrated in phantom in FIG. 3, thereby closing the port 52, and releasing the pressure against the ball 55, whereby the ball 55 is drawn out of its seat 51, due to the vacuum (partial vacuum) within the chamber 57, thereby opening the port 53, for drawing gas from the line 16, which is supplied through the chlorinator 14 from the tank 12, with the gas in the line 16 thus being at a lesser vacuum (higher absolute pressure), because the vacuum is reduced due to the positive pressure of the gas within the tank 12.

It will thus be observed that the switchover takes place automatically, allowing for disconnection of the empty tank 11 and replacement, without requiring any manual assistance in the switching over, and without interrupting the supply of gas to the line 24.

It will be noted that the nuts 56 and 57 are sized to have a predetermined spacing therebetween, as illustrated in FIG. 3, such that, regardless of the vacuum induced in the chamber 57, both the ports 52 and 53 cannot be closed simultaneously, because both balls 54 and 55 cannot be in contact with the spindle body 75, especially due to the dimensions selected for the nuts 56 and 57.

It will also be noted that the meters 19 and 29 are provided on the chlorinators 13 and 14, respectively, for the purpose of visually indicating which unit is in operation at any given time.

It will further be apparent that the device disclosed herein is adaptable for use with gases other than chlorine, but that chlorine is cited as being an exemplary use of the same. In many instances, it is uneconomical or impossible to maintain twenty-four hour supervision of a chlorine supply system. Accordingly, an automatic switchcover is highly desirable in those instances where shut-down or non-delivery of a gas to a system is undesirable or impossible. Also, if desired, an alarm can be provided, for actuation when a given tank 11 or 12 becomes empty, to remind an operator to replace an empty cylinder.

It will also be apparent that the term "vacuum" as used herein refers to an absolute pressure of less than atmospheric pressure, or less than 14.7 pounds per square inch.

It will be apparent from the foregoing that various modifications may be made in the details of construction, as well as in the use and operation, and as well as in materials of construction of the device of this invention, or gas used and which the device of this invention is adapted to convey, all within the spirit and scope of the invention, as defined in the appended claims.

What is claimed is:

1. A system for supplying a gas to a liquid comprising means for creating a vacuum for vacuum delivery of gas supplied to the system for introduction into the liquid, first positive pressure gas supply means, second positive pressure gas supply means, first vacuum operated means for converting gas from said first supply means to a negative pressure supply, second vacuum operated means for converting gas from said second supply means to a negative pressure supply, and vacuum operated switchover means connected to said vacuum creating means and each of said first and second converting means for directing gas from one of said first and second converting means to said vacuum creating means by placing said vacuum creating means and said one of said first and second converting means into intercommunication and for automatically discontinuing the intercommunication between said vacuum creating means and said one converting means upon an increase in vacuum or negative pressure between said switchover means and said one converting means, and substantially simultaneously placing said vacuum creating means and the other of said first and second converting means into intercommunication, without manual actuation.

2. The system of claim 1, including means for regulating the vacuum delivered flow of gas between said switchover means and said vacuum creating means.

3. The system of claim 2, wherein each said gas supply means comprises a tank containing a gas over a liquid.

4. The system of claim 3, wherein each said converting means is mounted directly on an associated said tank.

5. The system of claim 1, wherein said means for creating a vacuum comprises means responsive to a flow of water for creating a decreased pressure or suction condition.

6. A vacuum operated switchover device, comprising a chamber, first and second fluid inlets for said chamber, an outlet for said chamber, for connection to a source of vacuum, first and second blocking means each movable into and out of seated positions blocking respectively associated first and second inlets, and over-center linkage means movable between said blocking means, each said blocking means and linkage means being arranged such that said blocking means when in its seated position, is in contacting engagement with said linkage means and is mounted for movement toward the other said blocking means in response to increased vacuum in said chamber, said linkage means being mounted for over-center repositioning by said seated blocking means for engagement with the other unseated said blocking means, with said linkage means when in said over-center position being in engagement with said other blocking means and with said other blocking means being in a seated position and said one blocking means being in an unseated position out of engagement with said linkage means.

7. The device of claim 6, wherein said chamber includes diaphragms comprising chamber wall portions, said diaphragms each being mounted for movement in response to changes in negative pressure application inside the chamber.

8. The device of claim 7, including seats carried by said diaphragms and comprising portions of said fluid inlets, with said blocking means comprising balls movable into seated positions in said seats.

9. The device of claim 8, wherein said linkage means comprises a pair of linkage members spring biased toward one of two alternate over-center positions of engagement with one said ball.

10. The device of claim 8, wherein protrusions are provided carried by each said seat which are positioned and sized for straddling said linkage means and engaging each other with said linkage means therebetween, but with said linkage means not in engagement with both of said balls simultaneously.

11. An automatic switchover device, comprising a chamber, a pair of inlet ports for the chamber, an outlet port for the chamber, a pair of diaphragms disposed opposite one another on either side of the chamber, each diaphragm being provided with a seat disposed generally centrally thereof, having an opening therein communication with an inlet port, a ball being provided for each seat, and movable into and out of seating engagement therewith, and an over-center linkage, being movable between positions of engagement with the balls, for selectively urging the balls into seated engagement, with the chamber being constructed to be air-tight with the balls in seated engagement, and with the linkage means being spring-biased.

12. The device of claim 11, wherein the linkage means is provided with an apex at each end thereof, with each apex being in engagement with a groove of a plate fixedly carried by the device, with the plates being disposed across opposite ends of the chamber.

References Cited

UNITED STATES PATENTS

| | | | |
|---|---|---|---|
| 2,285,686 | 6/1942 | Shanley | 137—113 |
| 2,654,564 | 10/1953 | Pech | 251—75 |
| 2,741,257 | 4/1956 | Edwards | 137—113 |
| 2,966,920 | 1/1961 | Oglesby | 137—113 |

LAVERNE D. GEIGER, Primary Examiner

W. H. WRIGHT, Assistant Examiner

U.S. Cl. X.R.

137—112, 505, 510